US009829859B2

(12) United States Patent
Fickes et al.

(10) Patent No.: US 9,829,859 B2
(45) Date of Patent: Nov. 28, 2017

(54) MULTILAYER FILM AND AUTHENTICATION LABEL

(71) Applicant: DUPONT AUTHENTICATION, INC., Wilmington, DE (US)

(72) Inventors: Michael G Fickes, Kennett Square, PA (US); Michael L Levin, Newark, DE (US)

(73) Assignee: DUPONT AUTHENTICATION, INC., Wilmington, DE (US)

( * ) Notice: Subject to any disclaimer, the term of this patent is extended or adjusted under 35 U.S.C. 154(b) by 0 days.

(21) Appl. No.: 14/689,166

(22) Filed: Apr. 17, 2015

(65) Prior Publication Data
US 2015/0301500 A1    Oct. 22, 2015

Related U.S. Application Data

(60) Provisional application No. 61/981,238, filed on Apr. 18, 2014.

(51) Int. Cl.
*G03H 1/02* (2006.01)
*B32B 7/06* (2006.01)
(Continued)

(52) U.S. Cl.
CPC .............. *G03H 1/0011* (2013.01); *B32B 7/06* (2013.01); *B32B 7/12* (2013.01); *B32B 27/08* (2013.01);
(Continued)

(58) Field of Classification Search
None
See application file for complete search history.

(56) References Cited

U.S. PATENT DOCUMENTS 4,965,152 A * 10/1990 Keys ............... G02B 5/203
359/15
5,153,042 A    10/1992 Indrelie
(Continued)

FOREIGN PATENT DOCUMENTS

EP    1168111 A2    1/2002
EP    2377681 A1   10/2011
(Continued)

OTHER PUBLICATIONS

ASTM D903_98, Standard Test Method for Peel or Stripping Strength of Adhesive Bonds.
(Continued)

*Primary Examiner* — Martin Angebranndt
(74) *Attorney, Agent, or Firm* — Oliff PLC (57) ABSTRACT

The invention pertains in a first aspect to a multilayer film that includes a frangible holographic image layer and an adhesive layer adjacent to a side of the holographic image layer; and, an additional temporary support layer that is adjacent a side of the holographic image layer that is opposite the adhesive layer, and provides integrity to the multilayer film. The additional temporary support layer can be a polyester film that is removable from the multilayer film at ≤10 gram per inch peel strength; or, can be a heat-shrinkable film that is removable from the multilayer film with the application of heat. After application of the multilayer film to a substrate, the holographic image layer forms an exterior surface of the multilayer film. In a second aspect, the invention pertains to an authentication label of the multilayer film for attachment to a substrate, wherein a side of the adhesive layer that is opposite the holographic image layer contacts the substrate, and the holographic image layer forms an exterior surface of the label.

20 Claims, 3 Drawing Sheets (51) Int. Cl.
  B32B 7/12      (2006.01)
  B32B 27/36     (2006.01)
  B32B 27/30     (2006.01)
  B32B 38/10     (2006.01)
  G03H 1/00      (2006.01)
  B32B 27/14     (2006.01)
  B32B 27/08     (2006.01)
  B32B 38/00     (2006.01)
  G09F 3/00      (2006.01)
  B32B 37/00     (2006.01)
  B32B 37/12     (2006.01)
  G09F 3/04      (2006.01)
  C09J 7/02      (2006.01)

(52) U.S. Cl.
  CPC ............ *B32B 27/14* (2013.01); *B32B 27/302*
        (2013.01); *B32B 27/304* (2013.01); *B32B 27/36* (2013.01); *G03H 1/0248* (2013.01);
        *G03H 1/0252* (2013.01); *G03H 1/0256* (2013.01); *G03H 1/0272* (2013.01); *B32B 37/0015* (2013.01); *B32B 37/12* (2013.01);
        *B32B 38/0036* (2013.01); *B32B 38/10* (2013.01); *B32B 2250/05* (2013.01); *B32B 2270/00* (2013.01); *B32B 2307/40* (2013.01);
        *B32B 2307/736* (2013.01); *B32B 2439/00* (2013.01); *B32B 2519/00* (2013.01); *C09J 7/0296* (2013.01); *C09J 2203/334* (2013.01);
        *C09J 2425/006* (2013.01); *C09J 2427/006* (2013.01); *C09J 2433/00* (2013.01); *C09J 2467/006* (2013.01); *G03H 2210/30* (2013.01);
        *G03H 2240/50* (2013.01); *G03H 2250/10* (2013.01); *G03H 2250/35* (2013.01); *G03H 2250/39* (2013.01); *G03H 2250/40* (2013.01);
        *G03H 2250/44* (2013.01); *G09F 3/0291* (2013.01); *G09F 3/04* (2013.01)

(56) References Cited

U.S. PATENT DOCUMENTS

| | | | |
|---|---|---|---|
| 5,300,169 A * | 4/1994 | Tahara | G03H 1/0236 156/230 |
| 5,318,816 A * | 6/1994 | Yin | B44C 1/1737 428/343 |
| 5,629,093 A | 5/1997 | Bischof et al. | |
| 5,884,425 A | 3/1999 | Baldwin | |
| 5,920,290 A | 7/1999 | McDonough et al. | |
| 6,066,378 A | 5/2000 | Morii et al. | |
| 6,482,489 B1 * | 11/2002 | Otaki | G03H 1/0248 428/195.1 |
| 6,506,468 B1 | 1/2003 | Morii et al. | |
| 6,706,354 B1 | 3/2004 | Otaki et al. | |
| 6,737,154 B2 * | 5/2004 | Jonza | B32B 27/08 264/284 |
| 6,815,027 B2 | 11/2004 | Morii et al. | |
| 6,835,430 B2 | 12/2004 | Morii et al. | |
| 6,887,546 B2 | 5/2005 | Morii et al. | |
| 6,940,534 B2 | 9/2005 | Oshima et al. | |
| 7,095,324 B2 | 8/2006 | Conwell et al. | |
| 8,678,289 B2 | 3/2014 | Roseman | |
| 2002/0018253 A1 * | 2/2002 | Toshine | B32B 27/08 359/3 |
| 2005/0170259 A1 * | 8/2005 | Holmes | G03H 1/0248 430/1 |
| 2006/0005918 A1 * | 1/2006 | Azakami | B31D 1/021 156/230 |
| 2006/0019172 A1 * | 1/2006 | Ohtaki | G03H 1/0256 430/1 |
| 2007/0070477 A1 * | 3/2007 | Eto | G03H 1/0005 359/12 |
| 2007/0291339 A1 * | 12/2007 | Kumasawa | G03H 1/0011 359/2 |
| 2010/0173229 A1 * | 7/2010 | Hikida | B65D 23/0878 430/2 |
| 2010/0178438 A1 * | 7/2010 | Hikida | C08G 65/105 428/29 |
| 2013/0114119 A1 * | 5/2013 | Perlot | G01N 21/4788 359/2 |
| 2015/0301499 A1 * | 10/2015 | Fickes | G03H 1/0011 430/2 |

FOREIGN PATENT DOCUMENTS

| | | |
|---|---|---|
| GB | 2129739 A | 5/1984 |
| GB | 2320615 A | 6/1998 |
| JP | 2007/090567 A | 12/2007 |

OTHER PUBLICATIONS

ASTM D3330/d3330M_04 Standard Test Method for Peel Adhesion of Pressure—Sensitive Tape.
International Search Report dated Jul. 1, 2015, PCT/US2015/026419 Filed Apr. 17, 2015.

* cited by examiner

MULTILAYER FILM AND AUTHENTICATION LABEL

BACKGROUND INFORMATION

Field of the Disclosure

This disclosure pertains to multilayer films and authentication labels.

Description of the Related Art

Holographic images may be used for identification and authentication of products and may be applied directly to the products or the product packaging. The most common hologram used is a surface-relief hologram, formed by a patterning and stamping process in which a relief grating is formed on the surface of a recording medium, such as a photoresist material. In a surface-relief hologram, interference planes are predominantly perpendicular to the recording surface and the surface-relief grating of the recording medium provides for the diffraction of incident light, enabling the formation of the observed holographic image. As basic holographic technology becomes more widely available, however, such a simple hologram may be more easily counterfeited and applied to non-authentic products. Therefore, a surface-relief hologram has limited value as an authentication and/or security device.

Another type of hologram is a volume-phase hologram, in which a recording medium is a photosensitive material, such as a silver halide emulsion, a dichromated gelatin or a photopolymer. In a volume-phase hologram, the interference planes are not limited to just being perpendicular to the recording surface (as in surface relief holograms), but can be at a variety of angles with respect to the recording surface. Photo-imaging creates interference fringes throughout the depth of the recording medium that diffract light and create the observed holographic image. Unlike a surface-relief hologram, which does not reflect light, but only diffracts light in transmission, a volume-phase hologram can do both. Volume-phase holograms are more difficult and costly to produce than surface-relief holograms, but enable the production of a more detailed image that has greater three-dimensional character, complete with parallax, and is far more challenging to counterfeit.

Holographic recording mediums typically include at least one support film that supports a layer of the photosensitive material; and, particularly for photopolymeric holographic recording mediums, can include a coversheet or protective film adjacent a side of the photosensitive material that is opposite the support film. Since a layer of the photosensitive material for holographic recording is frangible and lacks sufficient mechanical strength, the support film and the optional coversheet provides sufficient integrity to keep the frangible photosensitive layer intact and allow the holographic recording medium to be handled throughout the process to convert the recording medium into a holographic image layer containing desired holographic image without damage to the layer or the image. In general, multilayer films that contain the holographic image layer that still is frangible also include a support and/or protective layer to prevent damage of the holographic image layer during machine operation for automated application to form a label and/or for attachment to label stock or a substrate. In general, an authentication label that includes the frangible holographic image layer also includes at least a protective film layer as a top or outermost layer that protects the underlying layers and particularly the holographic image layer. The protective film layer is affixed to and is part of the authentication label to protect the label from damage throughout its lifetime. A polyester film is often used to protect the holographic image layer and the authentication label from damage.

A volume-phase hologram is often produced as an authentication label in the form of a multilayer film that is subsequently applied to a product using an adhesive layer. In some cases, counterfeiters will attempt to remove an authentication label from a genuine product or product packaging and reapply it to a non-authentic good. Often this is done by using heat (e.g., a heat gun) to soften the adhesive layer, and then carefully scraping the label off. The removal of the label can be facilitated by the presence of a protective film and/or support film, which allows the holographic image layer to be lifted or separated from the product or package without damage.

It would be desirable to produce an authentication label that cannot be readily removed from one substrate and reapplied to another. It also would be desirable to produce an authentication label in which the holographic image layer remains intact and undamaged for application to a substrate, but the holographic image layer is irreparably damaged if there is an attempt to remove the applied label from the substrate. For instance, a label in which the holographic image layer is uncovered after application to a substrate and not protected by a top protective film layer would discourage attempts to remove the label from the substrate. Alternatively, an authentication label that does not have sufficient mechanical integrity to separate, lift, or otherwise detach, the label from a substrate without damage to the holographic image layer would discourage attempts to remove the label from the substrate. It would be desirable to produce an authentication label that becomes highly frangible as a result of the application of heat or by any other means of separation from the substrate, and thus prevent successful removal of the label with the holographic image undisturbed.

SUMMARY

In a first aspect, there is provided a multilayer film for authentication. The multilayer film includes a frangible holographic image layer; and, an adhesive layer adjacent to one side of the holographic image layer; wherein the multilayer film includes an additional layer that provides mechanical integrity to the multilayer film. The additional layer is selected from i) or ii) as follows i) a first temporary support comprising a polyethylene terephthalate film that is adjacent a side of the holographic image layer that is opposite the adhesive layer and that is removable from the holographic image layer at a peel strength less than or equal to 10 grams per inch after application of the multilayer film to a substrate; or ii) a second temporary support comprising a heat-shrinkable film that is adjacent a side of the holographic image layer that is opposite the adhesive layer and is removable from the holographic image layer with heat after application of the multilayer film to the substrate; wherein the multilayer film does not include a permanent protective layer on or above the holographic image layer opposite the adhesive layer, so that the holographic image layer forms an exterior surface of the multilayer film.

In a second aspect, there is provided an authentication label for attachment to a substrate that includes a frangible holographic image layer; an adhesive layer adjacent to one side of the holographic image layer; and, wherein a side of the adhesive layer that is opposite the holographic image layer contacts the substrate to permanently adhere the label to the substrate, and, wherein the multilayer film does not include a permanent protective layer on or above the holographic image layer opposite the adhesive layer, so that the holographic image layer forms an exterior surface of the label.

BRIEF DESCRIPTION OF THE DRAWINGS

The invention is illustrated by way of example and not limitation in the accompanying figures.

Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments. Various features and/or embodiments of this invention are illustrated in drawings as described herein. These features and/or embodiments are representative only, and the selection of these features and/or embodiments for inclusion in the drawings should not be interpreted as an indication that subject matter not included in the drawings is not suitable for practicing the invention, or that subject matter not included in the drawings is excluded from the scope of the appended claims and equivalents thereof.

DETAILED DESCRIPTION

Throughout the following detailed description, similar reference characters refer to similar elements in all figures of the drawings.

The present invention concerns a multilayer film, and an authentication label for attachment to a substrate, which provides a means to impede, prevent, and/or render evident tampering of the transfer of the multilayer film or the authentication label from one substrate to another substrate. The multilayer film includes a frangible holographic image layer and an adhesive layer adjacent to a side of the holographic image layer; and an additional layer of a temporary support film adjacent to a side of the holographic image layer that is opposite the adhesive layer. A temporary support film provides sufficient integrity to the multilayer film so that the multilayer film can be applied to a substrate without damage to the holographic image layer. The holographic image layer as part of a label provides a means to identify a product or package as authentic. The presence of the temporary support film in the multilayer film provides sufficient strength to the multilayer film so that soundness or integrity of the frangible holographic image layer is protected and/or preserved, and thus is not impaired or disturbed by the process to convert a photosensitive recording element into a holographic image layer or during automated machine operations to form the authentication label or to attach the label to a substrate, such as a product, a package, or label stock. That is, the temporary support film of the multilayer film provides sufficient mechanical integrity to the multilayer film for the film to be manipulated, until it is attached to the substrate. After application of the multilayer film to the substrate, the temporary support film is removable by heating or by peeling the temporary support from the multilayer film. The removal of the additional temporary support layer uncovers the frangible holographic image layer in whole or in part, and creates an authentication label of the multilayer film on the substrate in which the holographic image layer forms an exterior surface of the multilayer film or label. Since the holographic image layer is frangible, the multilayer film cannot be separated or removed from the substrate without irreparable damage to the unprotected holographic image layer.

The term "adjacent" with reference to a particular layer means that the particular layer is close to or near to a second or reference layer; and, that the particular layer may contact the second or reference layer, typically at or on their respective planar surfaces; and, if not in direct contact, may have at least one other layer between the particular layer and the second or reference layer. The term adjacent includes embodiments in which the particular layer contacts the second layer, in whole or in part; and, embodiments in which one or possibly two or more other layers are interposed between the particular layer and the second or reference layer.

The term "frangible" refers to a material or a layer that through deformation tends to break up into fragments rather than deforming plastically and retaining its cohesion as a single object (i.e., layer). A material or layer or structure is frangible if it breaks, distorts, or yields (on impact) upon disturbance. An alternative term for frangible is brittle. A frangible holographic image layer lacks sufficient integrity to support itself, and can be damaged if lifted or manipulated without a suitable supporting layer. Particularly if the frangible holographic image layer is lifted or separated from a multilayer film or a substrate, the layer will fracture in whole or in part, unless aided by at least a self-supporting carrier, such as a polymeric film or paper.

The term "mechanical integrity" refers to a material or layer that exhibits a high tensile strength, that is; a large force is required to pull the material or layer apart. Such a material or layer is self-supporting and is capable of undergoing, without damage, typical processing operations involved in fabricating a multilayer film and an authentication label; and, has sufficient stiffness to facilitate automatic application (by machine) of an authentication label (from the multilayer film) to a substrate.

Holographic Image Layer

A holographic image layer can include a surface-relief hologram or a volume-phase hologram. In one embodiment, a holographic image layer comprises one or more volume-phase holograms. A holographic image layer can be produced from a recording medium that is a photosensitive material in which one or more holographic images may be recorded in a single layer, i.e., a holographic recording film (HRF). The photosensitive material can be a photopolymer in some embodiments; a silver halide emulsion in other embodiments; or, a dichromated gelatin in yet other embodiments. In a more specific embodiment, a photosensitive material can be a photopolymer. In an even more specific embodiment, a photopolymer can be a free-radical polymerization composition based on acrylate/methacrylate monomers. Examples of photopolymer HRFs include OmniDex® 717A (10 um) and OmniDex® 734 (20 um) (both from The DuPont Co., Wilmington, Del.).

Holographic recording mediums (i.e., photosensitive precursors to the holographic image layer) typically include at least one carrier that supports the layer of the photosensitive material; and, can optionally include a coversheet or protective film adjacent a side of the photosensitive material that is opposite the carrier. Since a layer of the photosensitive material for holographic recording is frangible and lacks sufficient mechanical strength, the carrier and the optional coversheet provides sufficient integrity to keep the frangible photosensitive layer intact and allow the holographic recording medium to be handled throughout the process to convert the recording medium into a holographic image layer containing desired holographic image without damage to the layer or the image. In most embodiments, the holographic recording medium is photopolymeric, and includes a photopolymeric layer between a carrier that is a support and a coversheet.

Materials suitable as the support for the photopolymeric composition layer that is capable of forming a holographic image include polymeric films such those formed by addition polymers and linear condensation polymers. Particularly suitable as the support material for the holographic recording film for use in the present invention is a polymeric film of polyethylene terephthalate, which may also be referred to herein as polyester film. In one embodiment the support for the holographic recording layer is a polyester film that is not a heat-shrinkable film. Support for the recording layer can have a thickness of from about 5 to about 175 μm. The support thickness can be from about 25 to about 175 μm in one embodiment; from about 25 to about 75 μm in some embodiments; and, from about 40 to about 60 μm in yet other embodiments. In some embodiments that use automatic application of the multilayer film or authentication label to a substrate, the thickness of the support is at least about 25 μm to about 75 μm.

In one embodiment, an image can be produced from a HRF in conjunction with a color-tuning film (CTF) which functions as a dry diffusion element containing monomers that swell the imaged HRF, resulting in a hologram that has increased brightness and a wider angle of view. Examples of CTFs included CTF123 and CTF146 (both from DuPont).

A holographic image layer can have a thickness in one embodiment of from about 1 to about 100 μm, or in other embodiments from about 5 to about 75 μm, or in yet other embodiments from about 10 to about 50 μm.

Adhesive Layer/s

In one embodiment, an adhesive layer can include a pressure-sensitive adhesive. In a specific embodiment, a pressure-sensitive adhesive can include an acrylic resin, a rubber-based resin, a silicone resin or a mixture thereof. Examples of acrylic-based pressure-sensitive adhesives include V-302ULP, V-778, V-29 and EXA-316 (all from FLEXcon Inc., Spencer, Mass.). In one embodiment, an adhesive layer can include an ultraviolet-cured adhesive. In another embodiment, the adhesive layer that is on or adjacent to the holographic image layer includes pressure-sensitive adhesives or ultraviolet-cured adhesives, but does not encompass heat-activated adhesives.

The adhesive layer may also be referred to as a back adhesive layer that is used to adhere the multilayer film to a substrate. Optionally prior to adhering the multilayer film to a substrate, the multilayer film can further include a release liner that is on a side of the adhesive layer that will attach to the substrate, and is opposite the holographic image layer. The release liner can be a silicone release PET or paper liner and is used to protect the adhesive layer until the multilayer film is ready to be adhered to the substrate, at which point the liner is removed.

In one embodiment, the multilayer film can form an authentication label that can include one or more adhesive layers. In a specific embodiment, an adhesive layer may be used to adhere a heat-shrinkable layer to holographic image layer. In most embodiments, the adhesive layer that is used to adhere a heat-shrinkable layer is a pressure-sensitive adhesive. An adhesive layer that can be used to adhere a holographic image layer to a substrate or to a heat-shrinkable layer can have a thickness in one embodiment of from about 5 to about 100 μm, or in another embodiment from about 5 to about 75 μm, or in yet another embodiment from about 10 to about 50 μm.

Additional Temporary Layer

The additional layer of the temporary support provides sufficient integrity to the multilayer film for the film to be manufactured and manipulated by even automated machine operations, until the multilayer film is attached to the substrate to form a label. After application of the multilayer film to the substrate, the temporary support is removable by heating or by peeling the temporary support from the multilayer film. The temporary support is not a permanent protective layer for the label and is no longer needed since by the removal of the temporary support, the surface of the frangible holographic image layer is uncovered making it more difficult for transfer or separation of the label from the substrate and rendering the label more susceptible (than labels with a protective layer) to show evidence of tampering.

The base support of the holographic recording material is a first embodiment (i) of the additional layer that temporarily provides sufficient integrity, particularly mechanical integrity, to the multilayer film so that the multilayer film can be manipulated without damaging or disturbing the holographic image layer. In one embodiment, the force to remove by peeling, i.e., peel strength, the first embodiment of the temporary support from the holographic image layer, without damaging or disturbing the holographic image layer, is less than or equal to 10 grams per inch. In some other embodiment the peel strength to remove by peeling the first temporary support from the holographic image layer is from 0.5 to 10 grams per inch. In another embodiment, the peel strength to remove by peeling the first temporary support from the holographic image layer is less than or equal to 5 grams per inch. In yet another embodiment, the peel strength to remove by peeling the first temporary support from the holographic image layer is from 0.5 to 5 grams per inch.

In most embodiments, a side of the support that is contiguous with the layer of the holographic recording material is not treated or provided with an adhesion promoting surface, i.e., the photosensitive layer resides on and contacts, the untreated surface of the support. Even though the layer of the holographic recording material is contiguous with the untreated surface of the support, under typical manufacturing and processing conditions in forming the holographic image and making a label therefrom, there are sufficient attraction force/s between the support and the holographic recording layer that the support does not separate from the recording layer. However, the untreated surface of the support allows for the support to be removed or peeled from the holographic image layer at a peel strength of up to or equal to 10 grams per inch, without damaging or disturbing the frangible holographic image layer. Because the support of the holographic recording material can remain with the recording layer, and yet can be removed or peeled away from the holographic image layer at relatively low peel strength without damage to the image layer, the support is considered one embodiment of a temporary support for use in the multilayer film and authentication labels of the present invention.

Alternatively other embodiments are contemplated in which a layer of the holographic recording material can reside on a surface of the support that is treated (i.e., flame, electron, or corona treatment), or includes an adhesion promoting layer, such as, a primer layer or subbing layer. However, such treatment or adhesion promoting layer would provide minimal adhesion between support and recording layer such that the support could still be peeled or separated from the holographic image layer and the multilayer film without damaging or disturbing to the holographic image layer. A side of the support that is opposite the recording layer may or may not be treated or include one or more other layers for other purposes of the holographic recording material.

The force used to remove by peeling a temporary support from the holographic image layer can be determined using an IMASS Slip/Peel Tester, Model SP-2000 (from (MASS, Inc., (Accord, Mass.)), using a 180 degree peel geometry at a peel speed of 12 inches per minute, at standard room temperature and humidity conditions. The holographic image layer is cut with a razor blade to a sample size of 1 inch by 12 inches. The sample was attached to the platen of the test device with tape. The peel strength test for the present invention similarly follows the protocol for the measurement of peel adhesion for the key aspects of peel geometry and peel speed as indicated above, according to standard test method ASTM D3330/D3330M-04 (2010) titled "Standard Test Method for Peel Adhesion of Pressure-Sensitive Tape", Test Method D. One difference from the test protocol of ASTM D3330/3330M is that the sample specimen for the peel adhesion test is not prepared, i.e., assembled, and then tested within 1 minute. In the present invention, the support and the holographic recording film are brought together at time of manufacture of the holographic recording film, and some time after the recording film may undergo one or more steps to prepare the holographic image layer. As such, the peel strength test of the support (of the recording film) to the holographic image layer is determined on a laminated sample of the holographic image layer that has all or substantially all the layers the will be used for the authentication label, but does not include the pressure sensitive adhesive layer of the multilayer film. In the present invention, the peel strength force is considered representative of the strength of the temporary support to the multilayer film at or about at the time the multilayer film is applied to the substrate or label stock.

In the present invention, the peel strength test is a measurement of the adherence of the (temporary) support to the holographic image layer, i.e., the force to overcome the adherence of the support at the interface to the holographic image layer. In one embodiment, the peel strength test is conducted on a sample of a holographic image layer that has been holographically imaged, blanket exposed to actinic radiation, laminated to a color tuning film to tune color, and heat processed resulting in a film laminate (of the holographic image layer) that includes, in order: the support for the holographic recording film; the photopolymer layer comprising the holographic image; the photopolymeric color tuning layer; and a support for the color tuning film. But since there are alternate possible embodiments of the holographic image layer, the sample of the holographic image film that is used for the peel strength test may be fairly representative of, i.e., can be the same as or substantially the same as, but need not be exactly the same as, the holographic image layer at the time the temporary support is removed when forming the label. So that the holographic image layer for the peel strip test can have other alternate embodiments consistent of the holographic image layer as the sample for the peel strength.

A heat-shrinkable layer is a second embodiment (ii) of the additional layer that temporarily provides integrity, particularly mechanical integrity, to the multilayer film so that the multilayer film can be manipulated without damaging or disturbing the holographic image layer. The heat-shrinkable layer includes a plastic film that shrinks when heat is applied. In one embodiment, a heat-shrinkable plastic film can be any film commonly used in the shrink sleeve/shrink band industry, such as a polyester film, a polystyrene film, a polylactic acid film or a polyvinyl chloride film. In a more specific embodiment, a polyester film may be a polyethylene terephthalate (PET) film, such as an oriented film of PET glycol-modified (PETG). Examples of heat-shrinkable PETG films include Bonpet 5A, Bonpet 6L and Bonpet 8A (all from Bonset America Corp., Browns Summit, N.C.). Examples of heat-shrinkable PVC films include SRAE, SRHS, SRUB, SRHSU, SRNHI and SRHL (all from Bonset America). In one embodiment, a heat-shrinkable layer can be a transparent film. In some embodiments, the support of the recording material (i.e., the first embodiment of the temporary support) is removed after forming the holographic image layer, and replaced with the heat-shrinkable layer as the second temporary support.

For typical heat-shrinkable films, when heat in the range of from about 55 to about 100° C. is applied for a sufficient amount of time, the films can shrink at least about 5 to 10% in one or more directions. Those skilled in the art will appreciate that a wide range of processing conditions (e.g., time and temperature) can be used to shrink heat-shrinkable films. A heat-shrinkable layer can have a thickness in one embodiment of from about 25 to about 250 µm, or in other embodiment from about 30 to about 150 µm, or in yet another embodiment from about 40 to about 75 µm.

An embodiment of the temporary support (i) and (ii) is included in the multilayer film in order to provide sufficient integrity to the multilayer film and the holographic image layer so that the frangible holographic image layer needed for an authentication label remains intact and is not damaged or disturbed in the preparation of the multilayer film into an authentication label adhered to a substrate. In the embodiments described above, the temporary support is an outermost layer of the multilayer film, and is adjacent to the frangible holographic image layer on a side opposite the adhesive layer used for adhering the multilayer film the substrate. Once adhered to the substrate, the temporary support is removable by peeling or heating, so that the frangible holographic image layer forms the exterior surface of the authentication label. Since the temporary support is not included in the authentication label, the temporary support is not intended as a protective layer that covers the holographic image layer and remains with the authentication label. Thus, the temporary support is not a permanent protective layer for the holographic image layer of the authentication label.

Optional Layers

In one embodiment, a multilayer film can further include one or more ink layers. In one embodiment, the ink layer(s) can be located at a variety of positions within (i.e., on, or between, or adjacent to, any layer of) the multilayer film, including in front of and behind the holographic image layer (from the perspective that one would view the holographic image). In some embodiments, ink layer(s) can provide additional security features for an authentication label that includes the multilayer film. In one embodiment, a multilayer film adhered to a substrate may include an ink layer between the multilayer film and the substrate. An example of an ink layer can include a patterned or un-patterned pigmented resin layer that allows a certain color to be viewed through the holographic image layer when viewed at certain angles. Another example of an ink layer can include a printed image that can be printed directly onto the holographic image layer, by flexographic printing for example. Another example of an ink layer can include a patterned layer, such as a serial number or a bar code, printed on an exterior surface, such as the front side, of the authentication label or a label-on-label composite. A variety of printing processes (e.g., flexographic printing, thermal transfer printing, etc.) may be used to print an ink layer; depending upon the layer, the ink, and the information that is being printed.

It is contemplated that in addition to the holographic imaging layer and the adhesive layer, and the additional layers as described above, the multilayer film can include one or more other layers, such as for example, a thermal transfer film, that can be located at a variety of positions within (i.e., on, or between, or adjacent to) any layer of the multilayer film, with the proviso that the one or more other layers are not a self-support film that remains with the multilayer film after application to the substrate.

The substrate is not limited and can include products or goods of tangible items such as, for example, articles, commodities, materials, merchandise, supplies, and wares; components of products or goods; packages or packaging for the products or goods; and labels, such as label stock. A multilayer film on a substrate that is another label, that can include other information (i.e., non-holographic or authentication information) can be referred to as a label-on-label composite, or simply label-on-label.

Label stock is used to manufacture conventional labels and is typically available in roll or sheet form. It consists of a face, a LS adhesive layer and often a release liner, with the LS adhesive layer interposed between the face and the release liner. The face is commonly paper-based or one based on a polymeric film, such as a polyester, e.g. PET, a polyolefin e.g. BOPP, an acetate, e.g. CDA, a polyacrylate or polymethacrylate, e.g. PMMA, a polyvinyl, e.g. PVC, a polystyrene, etc., although other face materials are possible. The face may consist of a multilayer structure; it may be engineered to give a tamper-evident readout, e.g. for self-voiding labels; it may be designed to change color upon heating, e.g. for direct thermal printing labels; it may be surface-treated to impart adhesion and print receptivity, etc. The LS adhesive layer is typically a pressure-sensitive adhesive such as those based on acrylic, silicone, or rubber resins. Other types of adhesives are possible for use as the LS adhesive layer in label stock, such as heat-activated adhesives, or uv-curable adhesives, and water moistenable adhesives. The release liner is generally paper-based or one based on a polymeric film and often contains a release coating on the surface, such as a silicone coating, to facilitate release from the adhesive layer, particularly in conjunction with the use of pressure-sensitive adhesives.

Unless otherwise indicated, in most embodiments label stock can include or be prepared to include information associated with the substrate, i.e., product or package, and does not include authentication labels or authentication identifiers in the form of a holographic image.

After the authentication label-on-base label, i.e., label-on-label composite, is adhered to the substrate, it could be possible to separate or remove the label-on-label composite since the label stock could include a face layer that provides sufficient mechanical integrity or strength that is needed to lift or carry the frangible holographic image layer without damage. However, this possibility can be avoided by appropriate selection of label stock. In most embodiments, the base label for the label-on-label composite is selected from label stocks that themselves are made to be tamper-evident upon attempt/s to remove the label from a substrate. Some examples of label stocks that have built-in tamper-evident capability include, but are not limited to, label stocks made with tamper-resistant face stocks of litho paper which have poor cohesive strength; label stocks made with highly brittle face stock, such as, for example, acetate films; label stocks that are made to delaminate in pieces that include face stocks of cavitated polyethylene or cavitated polystyrene; and label stocks made to self-void upon removal. The base label can optionally include one or more other capabilities to deter removal from a substrate such as, for example, incorporating security slits at edge/s of the label, or incorporating chevron slit/s into the label. Label stock has a built in tamper-evident capability if the label stock includes one or more layers, particularly a face layer, that destructs in some way upon tampering, and/or incorporates slit/s as described above. Appropriate selection of label stock that has one or more tamper-evident capabilities with the multilayer film that includes the uncovered frangible holographic image layer produces a label-on-label composite, in which either or both of the frangible holographic layer and the label stock will be damaged with an attempt to lift or separate or remove the authentication label from the base label or the label-on-label composite in its entirety from the substrate.

Multilayer Films

Figure 1A:
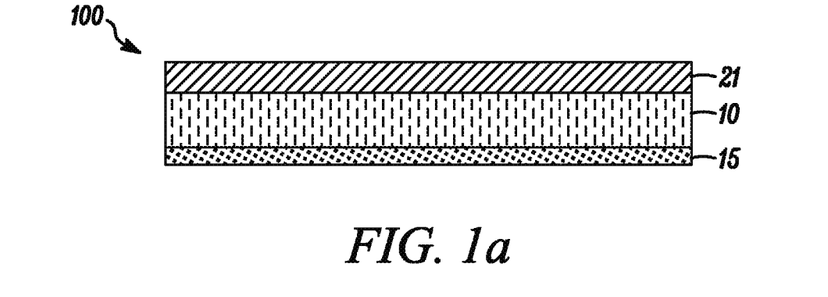
FIG. 1a is an illustration of a cross-sectional view of one embodiment of a multilayer film that includes a holographic image layer between an adhesive layer and one embodiment of a temporary support.
Figure 1B:
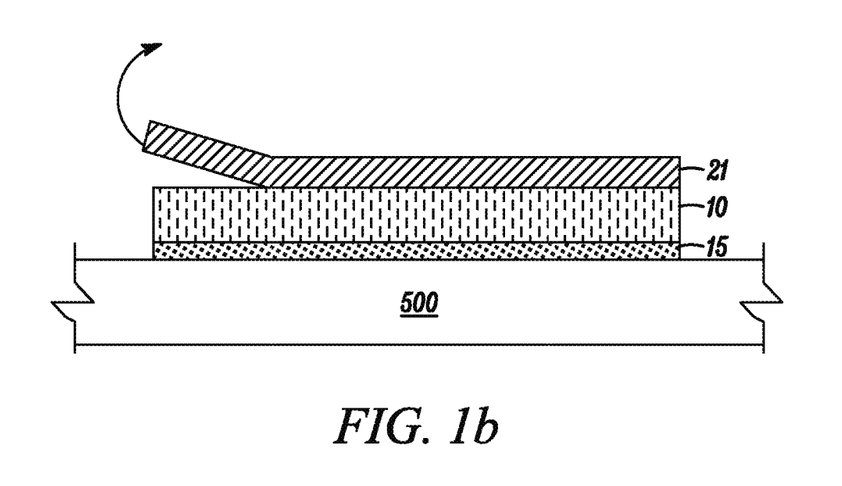
FIG. 1b is an illustration of a cross-sectional view of one embodiment of the multilayer film of FIG. 1a that is adhered to a substrate and showing removing of the temporary support from the multilayer film by peeling.
Figure 1C:
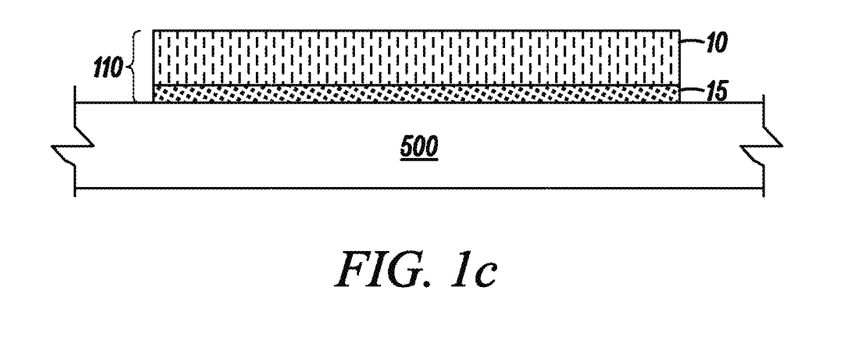
FIG. 1c is an illustration of a cross-sectional view of one embodiment of the multilayer film of FIG. 1b that forms a holographic authentication label on the substrate.

FIG. 1a through FIG. 1c illustrate one embodiment of a multilayer film 100. In FIG. 1a, the multilayer film 100 includes a frangible holographic image layer 10, and an adhesive layer 15 adjacent to one side of the holographic image layer; and an additional layer 21 that provides sufficient integrity to the multilayer film for the film to be manipulated. The additional layer 21 is adjacent a side of the holographic image layer 10 that is opposite the adhesive layer 15. In most embodiments of the multilayer film 100, the temporary support 21 directly contacts the holographic image layer 10. The multilayer film 100 includes as the additional layer 21 a first embodiment of the temporary support 21 that is removable from the multilayer film by peeling. A release liner (not shown) can be on or adjacent a side of the adhesive layer 15 that is opposite the holographic image layer 10. If present, the release liner is removed to attach the multilayer film 100 to a substrate 500. In FIG. 1b, the multilayer film 100 is adhered or attached to the substrate 500 via the adhesive layer 15. After the multilayer film 100 is adhered to the substrate 500, the temporary support 21 is removable from the multilayer film 100 by stripping or peeling the temporary support at a peel strength less than or equal to 10 grams per inch. In some other embodiments, the temporary support 21 is removable from the multilayer film 100 at a peel strength less than or equal to 5 grams per inch. In one embodiment, an edge of the first temporary support 21 can be captured or lifted for peeling with the use of adhesive tape that contacts at least a portion of an exterior surface of the temporary support 21 that is opposite the holographic image layer 10. In the embodiment shown in FIG. 1b, the temporary support 21 is peeled directly off of the holographic image layer 10, without disturbing or damaging the frangible holographic image layer. In FIG. 1c, the multilayer film 100 is an authentication label 110 composed of the holographic image layer 10 and the adhesive layer 15 that resides on the substrate 500. A surface of the holographic image layer 10 that is opposite adhesive layer 15 and the substrate 500 forms the exterior surface of the label 110. The label 110 does not include a protective film on or above the frangible holographic image layer 10, such that the holographic image layer cannot be lifted or separated alone or together with the adhesive layer 15 from the substrate 500 without irreparable damage to the label 110 and/or the holographic image layer.

Those skilled in the art will appreciate that the choice of materials for the different layers, their thicknesses and other factors will determine how well the layers adhere to each other, which in turn may determine whether the first temporary support 21 can be removable by peeling at a peel strength of less than or equal to 10 grams per inch without disturbing or damaging the frangible holographic image layer 10.

Figure 2A:
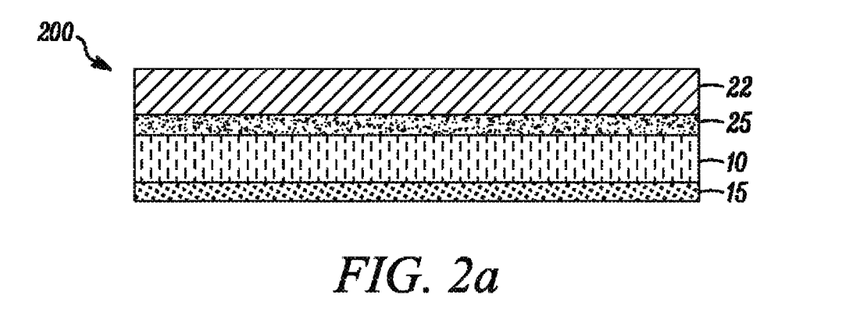
FIG. 2a is an illustration of a cross-sectional view of one embodiment of a multilayer film that includes a holographic image layer between an adhesive layer and another embodiment of a temporary support.
Figure 2B:
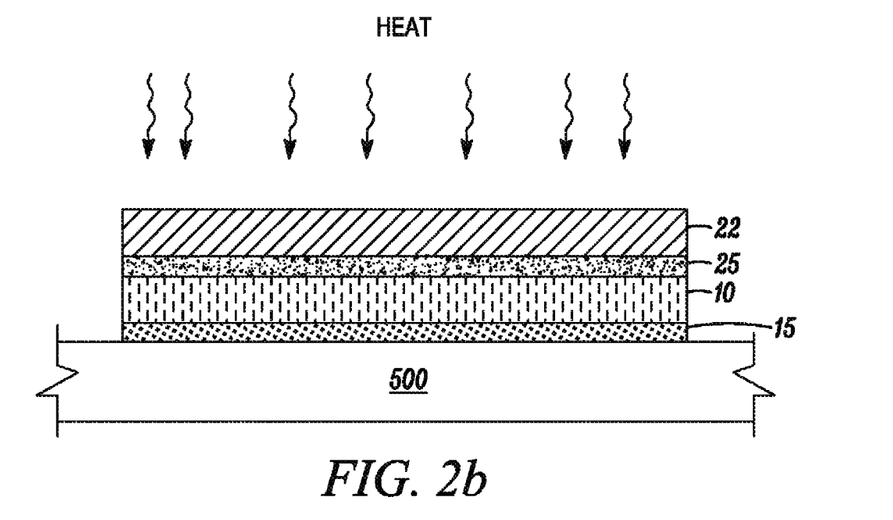
FIG. 2b is an illustration of a cross-sectional view of one embodiment of a multilayer film of FIG. 2a that is adhered to a substrate and showing heating of the temporary support of the multilayer film for removal of the temporary support.
Figure 2C:
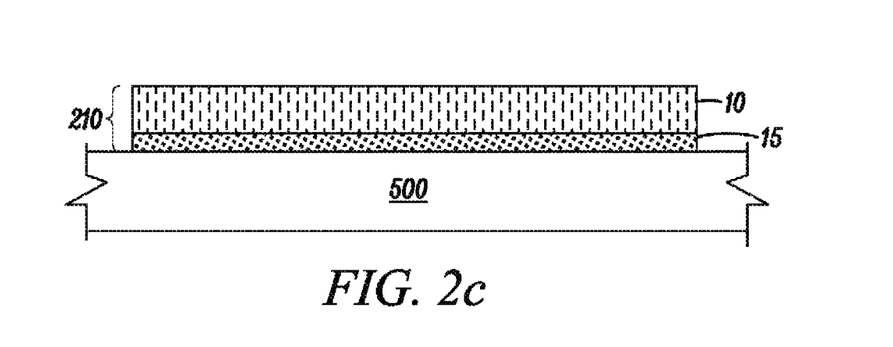
FIG. 2c is an illustration of a cross-sectional view of one embodiment of a multilayer film of FIG. 2b that forms a holographic authentication label on the substrate.

FIG. 2a through FIG. 2c illustrate one embodiment of a multilayer film 200. In FIG. 2a, the multilayer film 200 includes a frangible holographic image layer 10, and an adhesive layer 15 adjacent to one side of the holographic image layer; and an additional layer 22 that provides sufficient integrity for the film to be manipulated. The additional layer 22 is adjacent a side of the holographic image layer 10 that is opposite the adhesive layer 15. In the embodiment shown, the multilayer film 200 also includes a second adhesive layer 25 that is between the additional layer 22 and the holographic image layer 10 to temporarily adhere the additional layer 22 to the multilayer film 200. The multilayer film 200 includes as the additional layer 22 a second embodiment of the temporary support 22 that is a heat-shrinkable layer, which is removable from the multilayer film by applying heat to the multilayer film. A release liner (not shown) can be on or adjacent a side of the adhesive layer 15 that is opposite the holographic image layer 10. If present, the release liner is removed to attach the multilayer film 200 to a substrate 500. In FIG. 2b, the multilayer film 200 is adhered or attached to the substrate 500 via the adhesive layer 15. After the multilayer film 200 is adhered to the substrate 500, the heat-shrinkable layer as the second temporary support 22 is removable from the multilayer film 200 by heating at the conditions as described above, with for example, a hot air gun. In most embodiments, heating the multilayer film 200 can cause the heat-shrinkable layer as the second temporary support 22 and the second adhesive layer 25 to shrivel up, thereby uncovering the frangible holographic image layer 10. In some embodiments, heating the multilayer film 200 can cause the heat-shrinkable layer as the second temporary support 22 to shrivel up, which can leave the second adhesive layer 25 to remain, in whole or in part, on the holographic image layer 10. But the second adhesive layer 25 itself has very low cohesive strength, and would provide no or substantially no mechanical integrity to multilayer film 210 such that the substantially uncovered frangible holographic image layer 10 or label could not be removed of lifted or separated from the substrate 500 without irreparably damaging the frangible holographic image layer 10. So even if the second adhesive layer 25 remains with the holographic image layer 10, the holographic image layer has no or insufficient mechanical integrity to be removed, and thus is substantially uncovered and is still considered to substantially form an exterior surface of the multilayer film 200. Upon shrinking, the heat-shrinkable layer 22 can fall off or can be lifted from the multilayer film 200. In FIG. 2c, the multilayer film 200 is an authentication label 210 composed of the holographic image layer 10 and the adhesive layer 15 that resides on the substrate 500. A surface of the holographic image layer 10 that is opposite adhesive layer 15 and the substrate 500 forms the exterior surface of the label 210. The label 210 does not include a protective film on or above the frangible holographic image layer 10, such that the holographic image layer cannot be lifted, separated, or removed alone or together with the adhesive layer 15 (or even with the possible presence of the second adhesive layer 25) from the substrate 500 without irreparable damage to the label 210 and/or the holographic image layer.

Those skilled in the art will appreciate that the choice of materials for the different layers, their thicknesses and other factors will determine how well the layers adhere to each other, which in turn may determine whether the heat-shrinkable layer as the second temporary support 22 can be removable by heating without disturbing or damaging the frangible holographic image layer 10.

In some embodiments in which the holographic image layer is formed from a photopolymeric holographic recording film, the formation of the holographic image layer can include one or more steps that can be facilitated by the application of heat, such as for example, the lamination of a color tuning film to the imaged holographic recording film. In such embodiments, it may be useful to complete the formation of the holographic image layer prior to assembly of the multilayer film of the holographic image layer with the heat-shrinkable film.

Figure 3A:
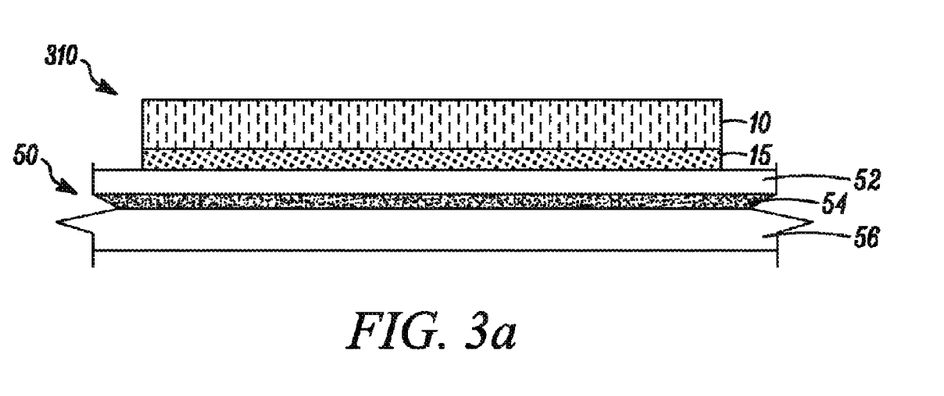
FIG. 3a is an illustration of a cross-sectional view of one embodiment of a multilayer film that is adhered to a surface of label stock to form label-on-label composite.
Figure 3B:
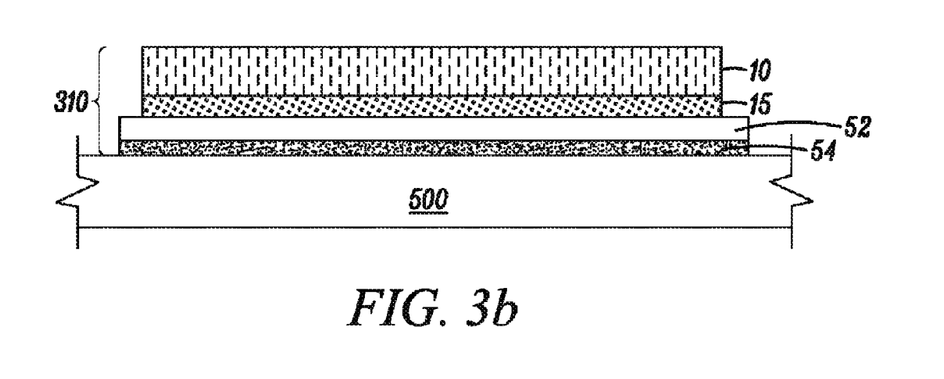
FIG. 3b is an illustration of a cross-sectional view of one embodiment of the multilayer film and label stock of FIG. 3a, in which the label-on-label composite is adhered to a substrate via an adhesive layer of the label stock.

FIG. 3a and FIG. 3b illustrate an alternate embodiment of a multilayer film 310 that is a label-on-label composite 310 for attachment to a substrate 500. In FIG. 3a, the multilayer film 310 includes a frangible holographic image layer 10, and an adhesive layer 15 that is adjacent to one side of the holographic image layer; and, a substrate of label stock 50. The label stock 50 may also be referred to herein as a base label 50. Either of the embodiments of the multilayer film 100 with the additional layer of the first temporary support 21 or the multilayer film 200 with the additional layer of the second temporary support 22 can be adhered via the adhesive layer 15 to label stock 50 as a substrate, instead of directly to a product or packaging substrate 500. Label stock 50 includes at least a face layer 52, a release liner 56, and a label stock adhesive layer, which for clarity will be referred to herein as LS adhesive layer 54, that is between the face layer 52 and the release liner 56. The label stock 50, particularly the face layer 52 may include other information, i.e., non-holographic information that is necessary for the authentication of the product or package. After adhering the multilayer film 100 or 200 to the face layer 52 of the label stock 50, the temporary support 21 is removable by peeling or the temporary support 22 is removable by heating, respectively. Since the label stock 50 includes at least the face layer 52 that is a self-supporting film or paper, the label stock 50 provides the necessary mechanical integrity to the multilayer film 310 to allow for the label-on-label composite to be handled and manipulated, without damaging or disturbing the uncovered frangible holographic image layer 10. In FIG. 3b, the release liner 56 of the label stock 50 has been peeled away, and the label-on-label composite 310 of the multilayer film 110, 210 and the label stock 50 is adhered to the substrate 500 via the LS adhesive layer 54. The label-on-label composite 310 forms an authentication label 110 or 210 that is composed of the holographic image layer 10, the adhesive layer 15, face layer 52, and LS adhesive layer 54 that is adhered to the substrate 500. A surface of the holographic image layer 10 that is opposite adhesive layer 15 and the substrate 500 forms the exterior surface of the label 310. The label 310 does not include a protective film on or above the frangible holographic image layer 10, such that the holographic image layer cannot be lifted or separated alone or together with the adhesive layer 15 from the face layer 52 of the label stock 50 without irreparable damage to holographic image layer.

Authentication Label

An authentication label that uses the multilayer film, which includes a holographic image layer and an adhesive layer, may be used for brand protection and authentication of products and may be applied directly to the products or the product packaging. The authentication label cannot be readily removed from one substrate and reapplied to another, without damage or irreparably disturbing at least the holographic image layer. Yet, as the exterior surface of the label, the uncovered, i.e., unprotected, frangible holographic image layer in end-use on a substrate is sufficiently resilient to scratches and damage under normal handling and remains intact. In one embodiment, after the removal of a temporary support by peeling or the application of heat, the authentication label includes the frangible holographic image layer as an exterior surface of the label. An authentication label having a frangible holographic image layer that does not include a permanent protective film layer, or include any other self-supporting film as a layer (i.e., associated with the multilayer film) is highly susceptible to damage, particularly the holographic image that provides authentication identification, in the event that the label is tampered with or an attempt to remove or separate the label from the substrate.

In a first aspect, a multilayer film includes or consists essentially of a frangible holographic image layer, an adhesive layer adjacent to one side of the holographic image layer, and an additional layer that is a temporary support adjacent a side of the holographic image layer that is opposite the adhesive layer, wherein the temporary support is removable from the multilayer film so that the frangible holographic image layer forms an exterior surface of the multilayer film that is on a substrate.

In one embodiment of the first aspect, the multilayer film does not include a permanent protective layer on or above a side of the holographic image layer that is opposite the adhesive layer. In a more specific embodiment, the multilayer film does not include a permanent protective layer before or after application of the multilayer film to a substrate. In another more specific embodiment, the multilayer film does not include a permanent self-supporting layer on or above a side of the holographic image layer that is opposite the adhesive layer. In another more specific embodiment, the multilayer film does not include a permanent self-supporting layer before or after application of the multilayer film to a substrate. In another more specific embodiment, the multilayer film forms on a substrate an authentication label that does not include a protective layer that is permanent, and that is on or above a side of the holographic image layer that is opposite the adhesive layer.

In one embodiment of the first aspect, the multilayer film includes the additional layer that is a first temporary support on or adjacent a side of the holographic image layer, wherein the first temporary support is removable from the multilayer film by peeling at a peel strength less than or equal to 10 grams per inch after application of the multilayer film to a substrate. In a more specific embodiment of the first aspect, the first temporary support is removable from the multilayer film by peeling at a peel strength of 0.5 to 10 grams per inch after application of the multilayer film to a substrate.

In one embodiment of the first aspect, the multilayer film includes the additional layer that is a second temporary support on or adjacent a side of the holographic image layer, wherein the second temporary support is a heat-shrinkable film that is removable from the multilayer film by applying heat after application of the multilayer film to a substrate.

In one embodiment of the first aspect, the multilayer film further includes a release liner on or adjacent a side of the adhesive layer opposite the holographic image layer In one embodiment of the first aspect, the holographic image layer includes a volume hologram. In a specific embodiment, the volume hologram includes an image recorded in a photopolymer, a silver halide emulsion, a dichromated gelatin, or any combination thereof.

In another embodiment of the first aspect, the holographic image layer further includes a color-tuning layer.

In another embodiment of the first aspect, the first temporary support comprises a carrier comprising a support film selected from polyethylene terephthalate film that is not heat-shrinkable.

In another embodiment of the first aspect, the second temporary support comprises a heat-shrinkable layer selected from a polyester film, a polystyrene film, a polylactic acid film, a polyvinyl chloride film, or any combination thereof. In a specific embodiment, the polyester film includes a polyethylene terephthalate glycol-modified film.

In still another embodiment of the first aspect, the adhesive layer includes a pressure-sensitive adhesive. In a specific embodiment, the pressure-sensitive adhesive is selected from acrylic resins, rubber-based resins, silicone resins, or any combination thereof.

In still yet another embodiment of the first aspect, the adhesive layer includes a pressure-sensitive adhesive that is selected from acrylic resins, rubber-based resins, silicone resins, or any combination thereof.

In still yet another embodiment of the first aspect, the adhesive layer includes an ultraviolet-cured adhesive.

In another embodiment of the first aspect, the multilayer film adheres to a substrate that is selected from a product, a package, a component, or a label stock.

In another embodiment of the first aspect, the multilayer film adheres to label stock and thereby forms a label-on-label composite. In a more specific embodiment, the label stock comprises at least a face layer, a release liner, and a LS adhesive layer between the face layer and the release liner. In a yet more specific embodiment, a side of the adhesive layer of the multilayer film that is opposite the holographic image layer contacts the face layer of the label stock. In another more specific embodiment, the authentication label includes label stock adhered to the multilayer film, and the multilayer film and the label stock together form a label-on-label composite on the substrate, wherein the label stock has a built-in tamper-evident capability.

In still yet another embodiment of the first aspect, the multilayer film further includes an ink layer.

In another embodiment of the first aspect, the multilayer film is capable of automated application by machine operation to form an authentication label on a substrate in which after removal of the temporary substrate the frangible holographic image layer forms an exterior surface of the label.

In another embodiment of the first aspect, the multilayer film that does not include a temporary support adheres to a substrate and forms an authentication label, where upon separation of one or more layers of the multilayer film from the substrate, at least the frangible holographic image layer is damaged.

In a second aspect, an authentication label for attachment to a substrate includes or consists essentially of a multilayer film comprising a frangible holographic image layer and, an adhesive layer between the holographic image layer and the substrate, wherein the adhesive layer contacts the substrate and adheres the label to the substrate, and the frangible holographic image layer forms an exterior surface of the label.

In one embodiment of the second aspect, an authentication label for attachment to a substrate includes a multilayer film that does not include a permanent protective layer on or above the holographic image layer opposite the adhesive layer. In another more specific embodiment of the second aspect, an authentication label for attachment to a substrate includes a multilayer film that does not include a permanent self-supporting layer on or above the holographic image layer opposite the adhesive layer.

In one embodiment of the second aspect, the authentication label includes a holographic image layer comprising a volume hologram that comprises image recording in a photopolymer layer. In a more specific embodiment of the second aspect, the holographic image layer further includes a color tuning layer. In another more specific embodiment, the adhesive layer includes a pressure-sensitive adhesive.

In another embodiment of the second aspect, the authentication label further includes a first ink layer between the holographic image layer and the adhesive layer.

In another embodiment of the second aspect, the authentication label adheres to a substrate that is selected from a product, a package, a component, or a label stock.

In another embodiment of the second aspect, the authentication label adheres to label stock forming a label-on-label composite.

In another more specific embodiment of the second aspect, the authentication label further includes label stock comprising a face layer, a release liner, and a LS adhesive layer between the face layer and the release liner; wherein the adhesive layer of the multilayer film that is opposite the holographic image layer contacts the face layer, so that the holographic image layer adheres to the label stock.

In a more specific embodiment of the second aspect, the authentication label further includes label stock adhered to the multilayer film, and the multilayer film and the label stock together form a label-on-label composite on the substrate, wherein the label stock has a built-in tamper-evident capability.

In another embodiment of the second aspect the authentication label adheres to a substrate and includes the multilayer film comprising the frangible holographic image layer, where upon separation of any one or more layers of the multilayer film from the substrate, at least the frangible holographic image layer is damaged.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "CTF" means color tuning film; "HRF" means holographic recording film; "PET" means polyethylene terephthalate film, or equivalently a polyester film; "UV" means ultraviolet (radiation); "UVA" means ultraviolet radiation which falls within the wavelength range of from 320 nanometers (nm) to 400 nm.

OmniDex® photopolymer holographic recording films, such as OmniDex® 717A; and, Photopolymeric Color Tuning Films, such as CTF 123; are all available from The DuPont Company (Wilmington, Del.).

Unless otherwise indicated, a photopolymer holographic recording film (HRF), OmniDex® 717A in conjunction with photopolymer color tuning film (CTF) were used to form the holographic imaging layer of the multilayer film.

The holographic recording film included a layer of a photopolymeric composition between a Melinex® 458 polyester (PET) support (from DuPont Teijin Films (Chester, Va.)) that was 2 mils thick (0.005 cm) and a coversheet of a polyester film. The Melinex® 458 PET support has a surface that is untreated and the photopolymeric layer resides on the untreated surface of the PET support.

Example 1

The photopolymer holographic recording film (HRF), OmniDex® 717A (DuPont), was holographically imaged at 476 nm and 532 nm with argon ion and VERDI solid state lasers (Coherent Inc., Santa Clara, Calif.), respectively, to record a copy of a master hologram in the HRF. The imaged HRF was then given a blanket UVA exposure (100 mJ/cm$^2$) and the coversheet removed; and followed by hot lamination of the side of the HRF without the coversheet to a photopolymer color tuning film (CTF), CTF123 at 100° C. and 3 meters per minute. The resulting laminate was then heat processed at 150° C. for 8 minutes. (Note for simplicity, the HRF having the holographic image recorded will continue to be referred to in this and following Examples as imaged HRF.)

After heat processing the imaged HRF/CTF laminate, a polyester (PET) liner on the CTF layer was removed and a black thermal transfer film (TTR-6937, Coding Products, Kalkaska, Mich.), consisting of a black-pigmented resin layer on a polypropylene carrier film, was hot-laminated to the CTF layer at 100° C. and 3 meters per minute. The polypropylene carrier film was then removed from the laminate, and a pressure-sensitive transfer adhesive (having 1 mil (25.4 micron) of V-778 acrylic-based adhesive on 2 mil (50.8 micron) POLY H-9 silicone-release PET film liner, (from FLEXcon Inc. (Spencer, Mass.)) was laminated to the black resin layer at room temperature and 3 meters per minute. The PET support of the imaged HRF layer was then removed, and a pressure-sensitive tape with a heat-shrinkable film (that was a 0.7 mil (17.8 micron) V-302ULP acrylic-based adhesive on 2 mil (50.8 micron) PETG film facestock (from FLEXcon)) was laminated to the uncovered side of the imaged HRF layer (that had the PET support) at room temperature and 3 meters per minute, giving a multilayer film having a structure in order of heat-shrinkable film/adhesive/imaged HRF/CTF/pigmented resin/back adhesive/release liner.

The multilayer film was then cut into 20 mm×20 mm labels and security slits were introduced at the label edges. The release liner was removed and the label was adhered to a high density polyethylene (HDPE) jar via the back adhesive layer. With the use of a hot air gun, the label on the jar was exposed to heated air and within 5 seconds, the heat-shrinkable PETG layer shriveled up, leaving behind and uncovering a highly frangible holographic image layer as an exterior surface of the label which could not be removed from the jar without irreparable damage.

It is believed that the adhesive layer of the heat-shrinkable film that was between the holographic image layer and the heat-shrinkable film also shriveled with the heat-shrinkable film (and therefore was removed) when the heat was applied. It was possible that the adhesive layer could remain on the holographic image layer of the multilayer film after heating. However, the possible presence of adhesive layer on the holographic image layer would not provide sufficient mechanical integrity to the frangible holographic image layer to prevent damage to the holographic image layer or the label.

Example 2

A photopolymer imaged HRF/CTF laminate was prepared as in Example 1. A pressure-sensitive tape (having 0.7 mil (17.8 micron) of V-302ULP acrylic-based adhesive on 2 mil (50.8 micron) PETG film facestock) was laminated to a side of the imaged HRF layer from which the PET support was removed at room temperature and 53 meters per minute. The PET liner on the CTF layer was then removed, the CTF surface corona-treated and a water-based black ink (Opta-Film Process Black) was flexographically printed directly on the CTF layer. A pressure-sensitive transfer adhesive (having 1.5 mil (38.1 micron) V-778 acrylic-based adhesive on 2 mil (50.8 micron) POLY H-9 silicone-release PET film liner) was laminated at room temperature and 53 meters per minute to the black ink layer giving a multilayer film having the structure of heat-shrinkable film/adhesive/imaged HRF/CTF/ink/adhesive/release liner.

Labels containing security slits were prepared by rotary die-cutting the multilayer film described above. The release liner was removed and the label then applied to a glass substrate. With the use of a hot air gun, the label on the glass was exposed to heated air and within 5 seconds, the PETG layer on top of the label shriveled up, leaving behind and uncovering the highly frangible holographic image layer of the label which could not be removed from the glass without irreparable damage. Similar to Example 1 after application of heat and the shriveling of the heat-shrinkable layer, it was contemplated that the presence or absence of the adhesive layer from the heat-shrinkable film on the label would not change the result of irreparable damage to the label upon removal from the glass.

Example 3

The procedure of Example 2 was repeated with the exception that the label was adhered to a high density polyethylene lid having a smooth surface instead of a glass substrate. With the use of a hot air gun, the label on the HDPE lid was exposed to heated air and within 5 seconds, the PETG layer on top of the label shriveled up, leaving behind and uncovering the highly frangible label which could not be removed from the lid without irreparable damage.

Example 4

The photopolymer holographic recording film (HRF), OmniDex® 717A, was holographically imaged at 476 nm and 532 nm with argon ion and VERDI solid state lasers (Coherent Inc., Santa Clara, Calif.), respectively, to record a copy of a master hologram in the HRF. The imaged HRF was then given a blanket UVA exposure (100 mJ/cm$^2$), and the coversheet removed; followed by hot lamination to a photopolymer color tuning film (CTF), CTF123, at 100° C. and 3 meters per minute. The resulting laminate having the structure [PET (from HRF)/imaged HRF/CTF/PET liner (from CTF)], was then heat processed at 150° C. for 8 minutes.

After heat processing the imaged HRF/CTF laminate, the polyester (PET) liner on the CTF layer was removed and a black thermal transfer film, TTR-6937, (from Coding Products (Kalkaska, Mich.)) consisting of a black-pigmented resin layer on a polypropylene carrier film was hot-laminated to the CTF layer at 100° C. and 3 meters per minute. The polypropylene carrier film was then removed from the laminate and a pressure-sensitive transfer adhesive (having 1 mil (25.4 micron) V-778 acrylic-based adhesive on a 2 mil (50.8 micron) POLY H-9 silicone-release PET film liner, (from FLEXcon Inc., Spencer, Mass.)) was then laminated to the black resin layer at room temperature and 3 meters per minute, giving a laminate having the structure of [PET (from HRF)/imaged HRF/CTF/black resin/adhesive/silicone-release PET liner].

The laminate was then cut into 20 mm×20 mm labels and security slits were introduced at the label edges. The silicone-release PET liner was removed and the label was adhered to a high density polyethylene (HDPE) jar. With the use of adhesive tape, the PET layer from the imaged HRF layer was removed from the applied label leaving behind and uncovering a highly frangible hologram on the jar which could not be removed without irreparable damage.

Example 5

The procedure of Example 4 was followed except that EXA-316 pressure-sensitive adhesive was used in place of the V-778 adhesive. The EXA-316 pressure-sensitive adhesive was 1 mil (25.4 micron) thick on a 53# basis weight super calendered kraft (SCK) paper release liner, (from FLEXcon Inc. (Spencer, Mass.)). The resulting laminate had the structure of [PET (from HRF)/imaged HRF/CTF/black resin/adhesive/silicone-release SCK paper liner].

As in Example 4, the laminate was then cut into 20 mm×20 mm labels and security slits were introduced at the label edges. The silicone-release paper liner was removed and the label was adhered to a cardboard substrate. With the use of adhesive tape, the PET layer from the imaged HRF layer was removed from the applied label leaving behind and uncovering a highly frangible hologram on the cardboard substrate which could not be removed without irreparable damage.

Example 6

The procedure of Example 5 was followed except that the [PET (from HRF)/imaged HRF/CTF/black resin/adhesive/

SCK silicone-release SCK paper liner] laminate was cut into a 11 mm wide strip. Using a laminator at a line speed of 3 meters/minute, the paper release liner was removed and the hologram strip was laminated at room temperature to white PET label stock (Fasson® Spec #78385, from Avery Dennison, (Mentor, Ohio)) and the PET top layer was removed from the laminated strip, which uncovered the frangible hologram. The resulting structure was [imaged HRF/CTF/black resin/adhesive/label stock with its own adhesive and release liner]. The base label stock containing the integrated hologram strip was then cut into 2 inch×2 inch labels, the release liner was removed from the base label, and the base label with integrated hologram strip then adhered to a glass plate. The highly frangible hologram strip could not be removed from the base label stock without irreparable damage.

Note that not all of the activities described above in the general description or the examples are required, that a portion of a specific activity may not be required, and one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that one or more modifications or one or more other changes can be made without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof has been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any sub-combination. Further, reference to values stated in ranges include each and every value within that range.

What is claimed is:

1. A multilayer film for authentication comprising:
a frangible holographic image layer; and,
an adhesive layer adjacent to one side of the holographic image layer;
wherein the multilayer film includes an additional layer that provides mechanical integrity to the multilayer film,
wherein the additional layer comprises:
a heat-shrinkable film as a temporary support that is adjacent a side of the holographic image layer that is opposite the adhesive layer and is removable from the multilayer film with heat after application of the multilayer film to the substrate;
wherein the multilayer film does not include a permanent protective layer on or above the holographic image layer opposite the adhesive layer, so that the frangible holographic image layer forms an exterior surface of the multilayer film;
the adhesive layer is not heat-activated, and comprises an ultraviolet-curable adhesive or a pressure-sensitive adhesive selected from acrylic resins, rubber-based resins, silicone resins, or any combination thereof; and
the substrate is selected from a product, a package, a component, or a label stock.

2. The multilayer film of claim 1 wherein the holographic image layer comprises a volume hologram.

3. The multilayer film of claim 2 wherein the volume hologram comprises an image recorded in a photopolymer, a silver halide emulsion, a dichromated gelatin, or any combination thereof.

4. The multilayer film of claim 1 wherein the holographic image layer further comprises a color-tuning layer.

5. The multilayer film of claim 1 wherein the heat-shrinkable film is selected from a polyester film, a polystyrene film, a polylactic acid film, a polyvinyl chloride film, or any combination thereof.

6. The multilayer film of claim 1 wherein the heat-shrinkable film comprises a polyethylene terephthalate glycol-modified film.

7. The multilayer film of claim 1 wherein the substrate comprises label stock, and the multilayer film and the label stock together form a label-on-label composite.

8. The multilayer film of claim 1 further comprising label stock comprising at least a face layer, a release liner, and a LS adhesive layer between the face layer and the release liner; wherein the adhesive layer of the multilayer film that is opposite the holographic image layer contacts the face layer, so that the holographic image layer is permanently adhered to the label stock.

9. The multilayer film of claim 1 further comprising label stock, and the multilayer film and the label stock together form a label-on-label composite on the substrate, wherein the label stock has a built-in tamper-evident capability.

10. The multilayer film of claim 1 further comprising a layer of a release liner contacts a side of the adhesive layer that is opposite the holographic image layer, and is removable prior to application of the multilayer film to the substrate.

11. The multilayer film of claim 1 further comprising an ink layer.

12. The multilayer film of claim 1 wherein the multilayer film is capable of automated application by machine operation to form an authentication label on a substrate, in which after removal of the additional layer of either the first or second temporary support, the frangible holographic image layer forms an exterior surface of the label.

13. The multilayer film of claim 1 wherein upon separation of one or more layers of the multilayer film from the substrate, at least the frangible holographic image layer is damaged.

14. An authentication label for attachment to a substrate comprising:
a multilayer film comprising:
a frangible holographic image layer;
an adhesive layer adjacent to one side of the holographic image layer;
wherein a side of the adhesive layer that is opposite the holographic image layer contacts the substrate and adheres the label to the substrate; and an additional layer that provides mechanical integrity to the multilayer film, wherein the additional layer comprises a heat-shiinkable film as a temporary support that is adjacent a side of the holographic image layer that is opposite the adhesive layer and is removable from the multilayer film with heat after application of the multilayer film to the substrate, wherein the multilayer film does not include a permanent protective layer on or above the holographic image layer opposite the adhesive layer, so that the holographic image layer forms an exterior surface of the label;

the adhesive layer is not heat-activated, and comprises a pressure-sensitive adhesive selected from acrylic resins, rubber-based resins, silicone resins, or any combination thereof; and the substrate is selected from a product, a package, a component, or a label stock.

15. The authentication label of claim 14 wherein the holographic image layer comprises a volume hologram that comprises an image recording in a photopolymer layer.

16. The authentication label of claim 14 wherein the holographic image layer further comprises a color-tuning layer.

17. The authentication label of claim 14 wherein the substrate is selected from a product, a package, a component, or a label stock.

18. The authentication label of claim 14 further comprising label stock comprising a face layer, a release liner, and a LS adhesive layer between the face layer and the release liner; wherein the adhesive layer of the multilayer film that is opposite the holographic image layer contacts the face layer, so that the holographic image layer adheres to the label stock.

19. The authentication label of claim 14 wherein the authentication label further comprises label stock adhered to the multilayer film, and the multilayer film and the label stock together form a label-on-label composite on the substrate, wherein the label stock has a built-in tamper-evident capability.

20. The authentication label of claim 14 wherein upon separation of the multilayer film from the substrate, at least the frangible holographic image layer is damaged.

* * * * *